Dec. 15, 1925.       1,565,648
S. T. HOYT
MACHINE FOR TRIMMING FRUITS
Filed Jan. 20, 1925       4 Sheets-Sheet 1
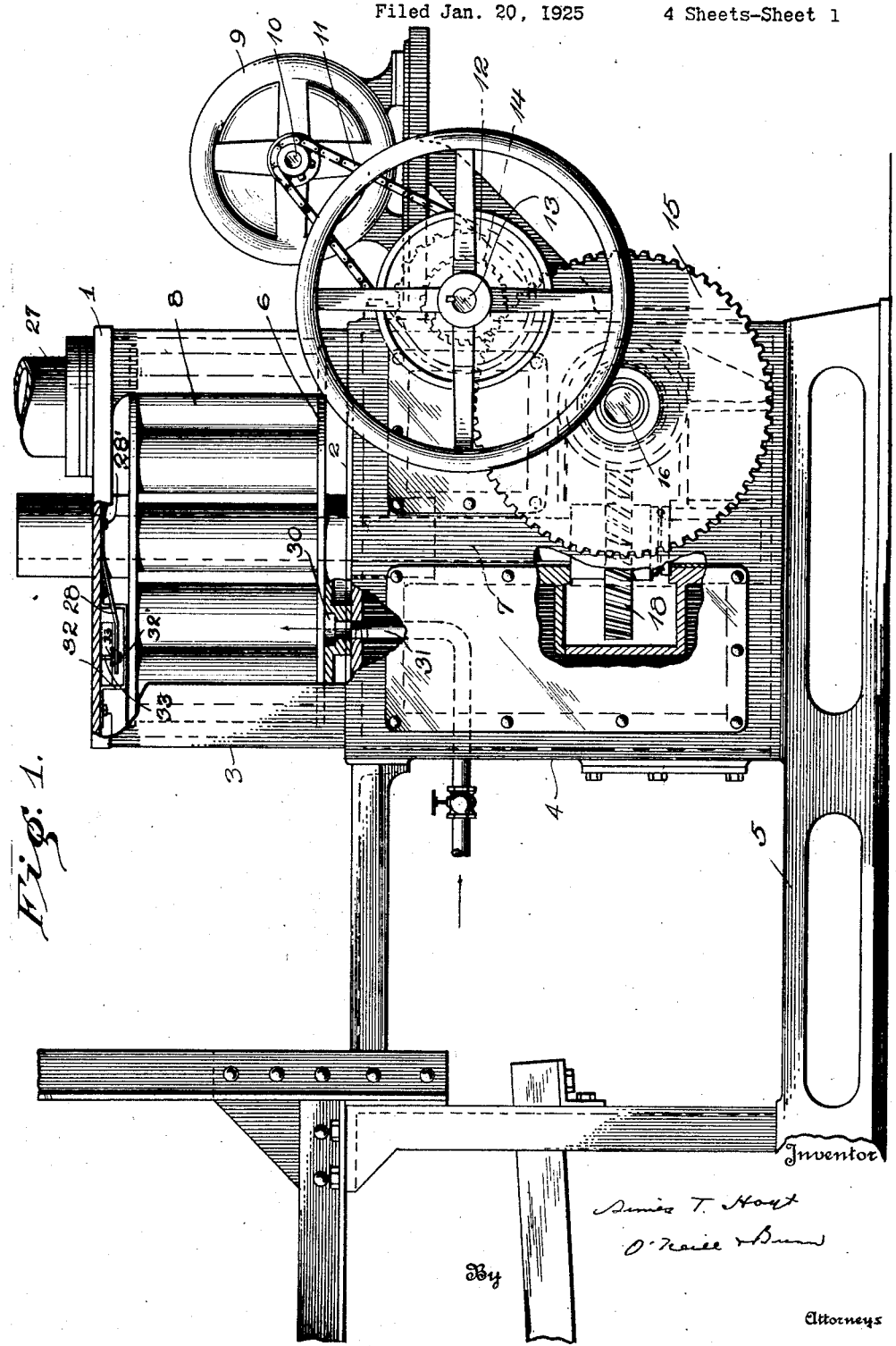

Dec. 15, 1925.
S. T. HOYT
1,565,648
MACHINE FOR TRIMMING FRUITS
Filed Jan. 20, 1925     4 Sheets-Sheet 2
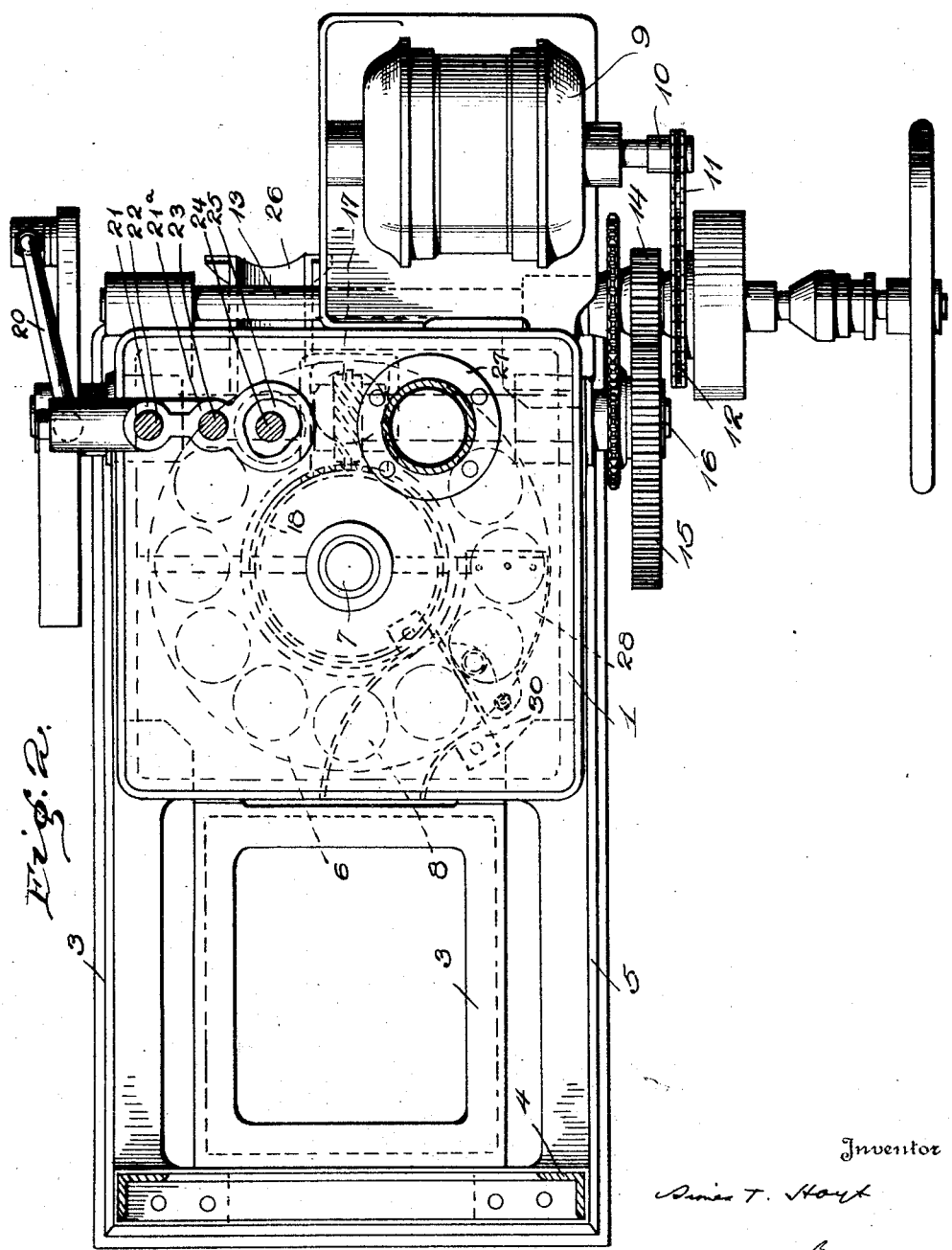

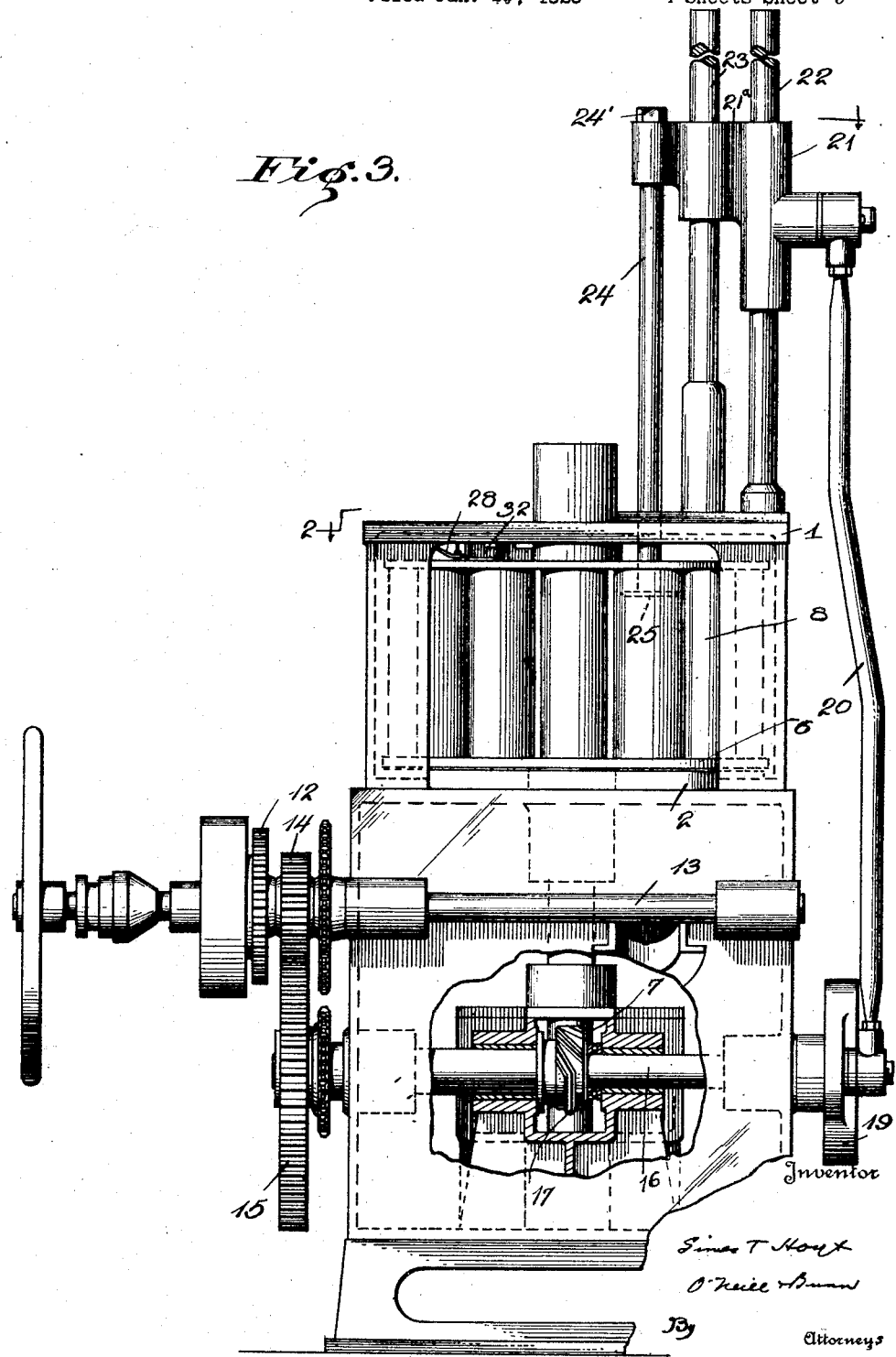

Dec. 15, 1925.    1,565,648
S. T. HOYT
MACHINE FOR TRIMMING FRUITS
Filed Jan. 20, 1925    4 Sheets-Sheet 4
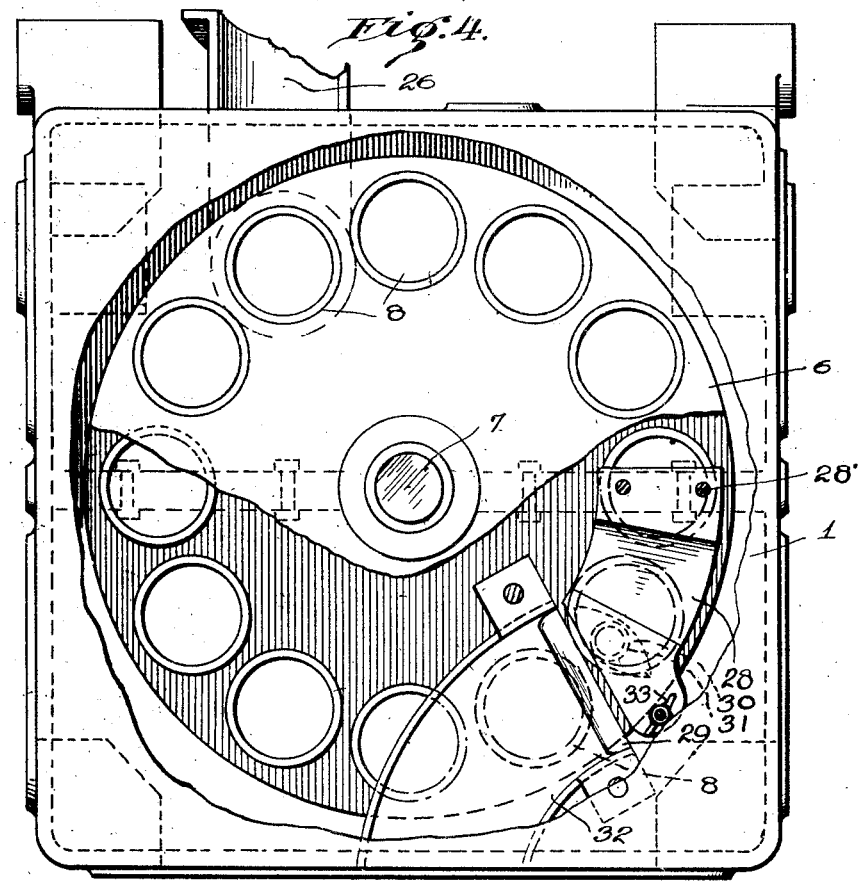
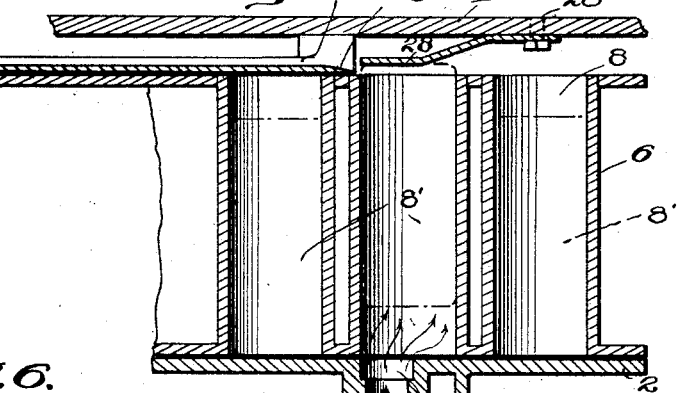
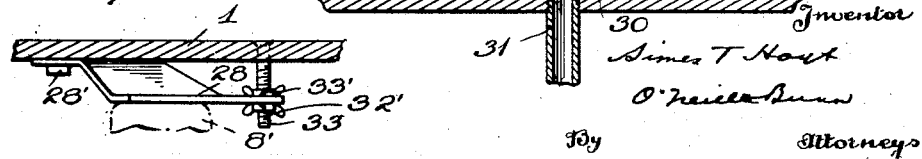

Patented Dec. 15, 1925.

1,565,648

UNITED STATES PATENT OFFICE.

SIMES T. HOYT, OF HONOLULU, TERRITORY OF HAWAII, ASSIGNOR TO HAWAIIAN PINEAPPLE COMPANY, LIMITED, OF HONOLULU, HAWAII, A CORPORATION OF HAWAII.

MACHINE FOR TRIMMING FRUITS.

Application filed January 20, 1925. Serial No. 3,632.

*To all whom it may concern:*

Be it known that I, SIMES T. HOYT, a citizen of the United States, residing at Honolulu, Territory of Hawaii, have invented certain new and useful Improvements in Machines for Trimming Fruits; and I do hereby declare the following to be a full, clear, and exact description of the invention, such as will enable others skilled in the art to which it appertains to make and use the same.

This invention relates to machines for treating fruit, such as pineapples, and more specifically for removing an end of the fruit in its passage through or over the machine.

The object of the invention is the provision of means for automatically removing or trimming an end of the previously sized fruit, and the apparatus herein to be described is an improvement on the machines disclosed in Patent No. 1,112,130, issued to H. G. Ginaca, on September 29, 1914, comprising a plurality of tubes each of which is adapted to receive a sized fruit, means for moving said tubes with a step-by-step movement to successive positions, means for severing an end of the fruit and for finally discharging the latter from the tube, all these desirable purposes being accomplished automatically, rapidly and effectively. The purpose of the complete machine is to cut off each end of the fruit as the drum 6 rotates. The present invention however relates to means for severing the upper end only of the fruit, the lower end thereof being removed by instrumentalities disclosed in copending application filed on January 20, 1925, in the name of Ernest M. Porter, Serial No. 3594.

One form of the invention is illustrated in the accompanying drawings forming a part of this specification, and in which similar reference characters indicate corresponding parts in each view.

Fig. 1 is a side elevation of the machine, with certain portions broken away to show the driving gears.

Fig. 2 is a top plan view of the machine, partially in section, showing the drum and cutter knife assembly in dotted lines.

Fig. 3 is an end plan view, with certain portions broken away to show the gearing.

Fig. 4 is a top plan view of the tube carrying drum, and the cutter knife for removing the end of the fruit.

Fig. 5 is a section taken vertically through that portion of the machine shown in Fig. 4, and Fig. 6 is a detailed sectional view taken laterally through the spring plate, and showing the adjusting means.

Now referring specifically to the drawings, the machine consists of upper and lower plates 1 and 2 respectively, supported on channel bars 3 secured to posts 4 which are mounted on a supporting base 5. A drum 6 is mounted on a rotatable shaft 7, which extends through the plates 1 and 2, said drum being provided with a plurality of tubular openings 8, here shown as twelve in number, each adapted to receive a sized pineapple.

As clearly shown in the drawings, the machine is equipped with an operating motor 9, having a drive shaft 10 operatively connected by a sprocket chain 11 to a gear 12 carried by a stub shaft 13. The shaft 13 also carries a gear 14 operatively engaging a large gear 15 on the end of a shaft 16 extending at an angle to the shaft 7 carrying the drum, as clearly shown in Figs. 1 and 3. The shaft 16 is also centrally provided with an interrupted worm-gear 17 which meshes with a worm-gear 18 carried by the lower portion of the shaft 7, as illustrated in Fig. 1. From the foregoing it is obvious that, under the operation of the motor, and because of the interrupted gearing, a continuously intermittent rotation may be imparted to the vertical shaft 7, and therefore to the drum 6 carried thereby.

Secured to the outer end of the shaft 16, is a disk crank 19, to which is pivoted a connecting rod 20, the other end of the rod extending upwardly above the drum and being pivotally connected to a cross-head 21 adapted to slide vertically on a guide bar 22, secured to the upper plate 1. The cross-head 21 is prevented from turning on the bar 22, by a smaller guide-bar 23 which passes through a lateral extension 21ᵃ of the cross head 21. The outer end of the extension 21ᵃ extends directly over the circular path traveled by the tubes 8 in the rotation of the drum 6, and a rod 24 is rigidly secured at 24' to the said outer end, as shown in Fig. 3. The rod 24 carries a plunger 25, shown in dotted lines in Fig. 3, said plunger being adapted, under the vertical reciprocation of the cross-head 21, to enter a tube 8 and to expel the fruit from the tube, during a periodical stop in the rotation of the drum, and after both ends of the fruit have been removed. If it is also desired to core the fruit, the plunger may be equipped with the coring mechanism disclosed in the Ginaca patent hereinbefore referred to. The fruit is expelled from the opening 8, into the chute 26, clearly shown in Figs. 2 and 4, whence it is conveyed to its proper destination for further treatment.

In Fig. 4 is illustrated a somewhat enlarged, fragmental, top view of the upper plate 1, and of the lower plate 2, the latter being directly below the drum 6. In Fig. 2 is shown a feed opening 27, extending through an opening in the plate 1, and sufficiently large to permit the passage of a sized fruit. The fruit is dropped through the opening 27 and into a tube 8, during an instant of rest of the drum 6, and, under the rotation of the drum the lower end of the fruit is removed by the means disclosed in the application hereinbefore referred to, the fruit thereafter passing to the upper-end removing devices to be now described.

As best illustrated in Figs. 1 and 5, the plate 1 is provided on its lower surface with a spring plate 28, secured by a bolt 28'. Secured also to the lower surface of the plate 1 is a cutter knife 29, its edge resting closely adjacent the inner edge of the spring plate 28. The lower plate 2 is ported at 30, in registration with the circular path of rotation of the tubes 8, and a conduit 31, connected to a source of air under pressure (not shown), extends into the port 30, whereby a blast of air enters the bottom of each tube 8 as soon as the tube advances into registration with the port 30.

In the operation of the cutting device for the top ends of the fruit, it will be understood that, after the lower end is cut off, the fruit drops downwardly and slides along upon the plate 2. In the rotation of the drum, as soon as the tube 8 containing the fruit 8' comes into registration with the port 30, the fruit 8' is subjected to a blast of air and is thereby raised until its top end contacts the spring plate 28. The continued rotation of the drum 6 forces the top end of the fruit against the knife 29, where the end is removed and drops into a take-off chute 32, shown in Figs. 2 and 4.

After the top of the fruit is removed the tube 8 which carries it passes out of registration with the port 30, and, subsequently reaches a position under the plunger 25 where it is expelled into the discharge 26.

To make the lower end of the spring plate 28 adjustable in order to cause the removal of fruit ends of varying thicknesses, I utilize a construction such as illustrated in Fig. 6 wherein I provide a screw-threaded post 32, extending through the spring plate 28 and rigidly secured to the plate 1. A wing nut 32' is mounted on the post 32, below the plate 28, and a similar nut 33' is mounted on the said post, above the plate 28. In operation, if a thin cut is desired both nuts are lowered to the desired position, or both raised for a thick cut, as will be clearly obvious.

It is of course to be understood that all of the herein described instrumentalities are so synchronized that the intermittent rotation imparted to the shaft 7 is such that the drum will always stop when a tube 8 is directly over the discharge chute 26, and another tube is directly under the feed opening 27. Also that the rotative motion is continuous during the period necessary to advance the upper end of a fruit to the knife 29, and until the upper end of the fruit is completely severed. It is also to be noted that the top plate 1 is spaced above the upper end of the drum 6, for the purpose of permitting movement of the spring plate 28, and for installation of the knife 29. The lower plate 2 is located immediately adjacent the lower ends of the tubes 8, in order that the fruit may slide thereover during rotation of the drum.

Modifications of the herein described structure will be suggested to those skilled in the art, but my invention comprehends all embodiments falling fairly within the scope of the appended claims.

What I claim is:

1. A machine for trimming fruit, comprising a traveling carrier provided with a plurality of tubes each adapted to receive a fruit, a knife located adjacent the path of travel of said carrier, and means for admitting fluid under pressure into one end of the tubes, whereby to move the contained fruit longitudinally therein, and project the end of the fruit into the plane of the knife.

2. A machine for trimming fruit, comprising a traveling carrier provided with a plurality of tubes each adapted to receive a fruit, a knife located adjacent the path of travel of said carrier, means for admitting fluid under pressure into one end of the tubes, whereby to move the contained fruit longitudinally therein, and project the end of the fruit into the plane of the knife, and means for limiting the longitudinal movement of the fruit in the tube.

3. A machine for trimming fruit, comprising a movable carrier provided with a plurality of tubes each adapted to receive a fruit, a cutter knife located above the carrier and adapted, under movement of the latter, to sever the ends of fruits projecting from the tube, and means for successively admitting fluid under pressure to the lower end of each tube whereby to cause the contained fruit to project outwardly into the plane of the knife.

4. A machine for trimming fruit, comprising a movable carrier provided with a plurality of tubes each adapted to receive a fruit, a cutter knife located above the carrier and adapted, under movement of the latter, to sever the ends of fruits projecting from the tube, means for successively admitting fluid under pressure to the lower end of each tube whereby to cause the contained fruit to project outwardly into the plane of the knife, and an element located adjacent the knife and yieldingly limiting movement of the fruit longitudinally of the tube.

5. A machine for trimming fruit, comprising a movable carrier provided with a plurality of tubes each adapted to receive a fruit, a cutter knife located above the carrier and adapted, under movement of the latter, to sever the ends of fruits projecting from the tube, means for successively admitting fluid under pressure to the lower end of each tube whereby to cause the contained fruit to project outwardly into the plane of the knife, an element located adjacent the knife and yieldingly limiting movement of the fruit longitudinally of the tube, and means for adjustably varying the position of said element.

6. A machine for trimming fruit, comprising a rotating drum provided with a plurality of fruit receiving tubes arranged to travel in a circular path under rotation of the drum, upper and lower stop plates positioned to limit longitudinal movement of the fruit within the tubes, a knife carried by the upper plate and located in a plane immediately above the plane of rotation of the drum, and means for admitting fluid under pressure to each tube immediately prior to its movement under the knife, whereby to force the end of the contained fruit into the plane of the knife.

7. A machine for trimming fruit, comprising a rotating drum provided with a plurality of fruit receiving tubes arranged to travel in a circular path under rotation of the drum, upper and lower stop plates positioned to limit longitudinal movement of the fruit within the tubes, a knife carried by the upper plate and located in a plane immediately above the plane of rotation of the drum, and means for admitting fluid under pressure to each tube immediately prior to its movement under the knife, whereby to force the end of the contained fruit into the plane of the knife, said means comprising a conduit extending through a port in the lower plate and in communication with a source of fluid under pressure.

8. A machine for trimming fruit, comprising a rotating drum provided with a plurality of fruit receiving tubes arranged to travel in a circular path under rotation of the drum, stop plates positioned at each end of the drum and limiting longitudinal movement of the fruit within the tubes, a knife carried by one stop plate and positioned in a plane parallel to the plane of rotation of the drum and adjacent the plane of travel of one end of the successive tubes, and means for admitting fluid under pressure to the other end of the successive tubes immediately prior to movement of the tube to a position opposite the knife, whereby to move the contained fruit into the plane of the knife.

9. A machine for trimming fruit, comprising a rotating drum provided with a plurality of fruit receiving tubes arranged to travel in a circular path under rotation of the drum, stop plates positioned at each end of the drum and limiting longitudinal movement of the fruit within the tubes, a knife carried by one stop plate and positioned in a plane parallel to the plane of rotation of the drum and adjacent the plane of travel of one end of the successive tubes, means for admitting fluid under pressure to the other end of the successive tubes immediately prior to movement of the tube to a position opposite the knife, whereby to move the contained fruit into the plane of the knife, and an element carried by said first mentioned stop plate and resiliently resisting projection of the fruit from the tube.

10. A machine for trimming fruit, comprising a rotating drum provided with a plurality of fruit receiving tubes arranged to travel in a circular path under rotation of the drum, stop plates positioned at each end of the drum and limiting longitudinal movement of the fruit within the tubes, a knife carried by one stop plate and positioned in a plane parallel to the plane of rotation of the drum and adjacent the plane of travel of one end of the successive tubes, means for admitting fluid under pressure to the other end of the successive tubes immediately prior to movement of the tube to a position opposite the knife, whereby to move the contained fruit into the plane of the knife, and an element carried by said first mentioned stop plate and resiliently resisting projection of the fruit from the tube, said element comprising an inclined spring plate carried by one of said stop plates.

11. A machine for trimming fruit, comprising a rotating drum provided with a plurality of fruit receiving tubes arranged to travel in a circular path under rotation of the drum, stop plates positioned at each end of the drum and limiting longitudinal movement of the fruit within the tubes, a knife carried by one stop plate and positioned in a plane parallel to the plane of rotation of the drum and adjacent the plane of travel of one end of the successive tubes, means for admitting fluid under pressure to the other end of the successive tubes immediately prior to movement of the tube to a position opposite the knife, whereby to move the contained fruit into the plane of the knife, an element carried by said first mentioned stop plate and resiliently resisting projection of the fruit from the tube, and means for adjustably varying the position of said element.

12. A machine for trimming sized fruits comprising a rotatable drum provided with a plurality of vertically-extending open-ended tubes each adapted to receive a sized fruit and to permit longitudinal gravitation of the latter therein, means limiting gravitation of the fruit in the tube, a knife located above the drum and adjacent the path of rotation of the tubes, means for pneumatically moving the fruit upwardly in the tubes, and means for limiting the upward movement of said fruit.

13. A machine for trimming sized fruits comprising a rotatable drum provided with a plurality of vertically-extending open-ended tubes each adapted to receive a sized fruit and to permit longitudinal gravitation of the latter therein, a fixed plate adjacent the lower periphery of the drum and limiting gravitation of the fruit in the tubes, a knife located above said drum, a port in said plate located below and adjacent the circular path of travel of said tubes and communicating with a source of fluid under pressure, and means for limiting the upward movement of the fruit in said tubes under the action of fluid passing through said port.

14. A machine for trimming sized fruits comprising a rotatable drum provided with a plurality of vertically-extending open-ended tubes each adapted to receive a sized fruit and to permit longitudinal gravitation of the latter therein, a fixed plate adjacent the lower periphery of the drum and limiting gravitation of the fruit in the tubes, a knife located above said drum, a port in said plate located below and adjacent the circular path of travel of said tubes and communicating with a source of fluid under pressure, and means for limiting the upward movement of the fruit in said tubes under the action of fluid passing through said port, comprising a flexible plate provided with a free portion located adjacent said knife and in a plane parallel therewith.

15. A machine for trimming sized fruits comprising a rotatable drum provided with a plurality of vertically-extending open-ended tubes each adapted to receive a sized fruit and to permit longitudinal gravitation of the latter therein, a fixed plate adjacent the lower periphery of the drum and limiting gravitation of the fruit in the tubes, a knife located above said drum, a port in said plate located below and adjacent the circular path of travel of said tubes and communicating with a source of fluid under pressure, and means for limiting the upward movement of the fruit in said tubes under the action of fluid passing through said port, comprising an adjustable plate provided with a flexible portion located adjacent said knife and in a plane parallel therewith.

16. A machine for trimming sized fruits comprising a rotatable drum provided with a plurality of tubes each adapted to receive a fruit at the top and to permit the fruit to project from the bottom, a knife located above and extending laterally over the drum, a stop plate located below the drum and limiting downward movement of the fruit within the tubes, means operable during rotation of the drum, for successively admitting fluid under pressure to the lower end of each tube, whereby to move the fruit upwardly in the tube and cause the upper end of the fruit to project into the plane of the knife, and means for limiting the upward movement of the fruit in the tubes.

17. A machine for trimming sized fruits comprising a rotatable drum provided with a plurality of tubes each adapted to receive a fruit at the top and to permit the fruit to project from the bottom, a knife located above and extending laterally over the drum, a stop plate located below the drum and limiting downward movement of the fruit within the tubes, means operable during rotation of the drum, for successively admitting fluid under pressure to the lower end of each tube, whereby to move the fruit upwardly in the tube and cause the upper end of the fruit to project into the plane of the knife, and means for limiting the upward movement of the fruit in the tubes, said means comprising an adjustable plate located adjacent and in a plane in substantial parallelism with the plane of the knife.

In testimony whereof I affix my signature.

SIMES T. HOYT.